United States Patent
Kim (10) Patent No.: US 9,063,610 B2
(45) Date of Patent: Jun. 23, 2015

(54) DISPLAY DEVICE AND METHOD FOR CONTROLLING THE SAME

(71) Applicant: LG ELECTRONICS INC., Seoul (KR)

(72) Inventor: Jihwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 126 days.

(21) Appl. No.: 13/660,809

(22) Filed: Oct. 25, 2012

(65) Prior Publication Data

US 2014/0055377 A1     Feb. 27, 2014

(30) Foreign Application Priority Data

Aug. 23, 2012 (KR) ........................ 10-2012-0092338

(51) Int. Cl.
| | |
|---|---|
| *G06F 3/041* | (2006.01) |
| *G09G 5/00* | (2006.01) |
| *G06F 1/16* | (2006.01) |
| *G06F 3/01* | (2006.01) |
| *G06F 3/044* | (2006.01) |

(52) U.S. Cl.
CPC ............ *G06F 3/0418* (2013.01); *G06F 1/1643* (2013.01); *G06F 3/016* (2013.01); *G06F 2203/04809* (2013.01); *G06F 3/044* (2013.01)

(58) Field of Classification Search
CPC ..... G06F 3/016; G06F 3/04886; G06F 3/418; G06F 1/1643; G06F 2203/04809; G06F 3/044; G07F 17/3209
USPC .......................................... 345/156, 173–175
See application file for complete search history.

(56) References Cited

U.S. PATENT DOCUMENTS

| | | | | |
|---|---|---|---|---|
| 6,750,877 | B2* | 6/2004 | Rosenberg et al. | 715/701 |
| 8,062,115 | B2* | 11/2011 | Thomas et al. | 463/16 |
| 8,421,609 | B2* | 4/2013 | Kim et al. | 340/407.1 |
| 8,451,248 | B1* | 5/2013 | Kim | 345/173 |
| 8,593,420 | B1* | 11/2013 | Buuck | 345/173 |
| 2008/0075233 | A1* | 3/2008 | Coombs | 378/204 |
| 2008/0158239 | A1 | 7/2008 | Lamy et al. | |
| 2009/0128503 | A1* | 5/2009 | Grant et al. | 345/173 |
| 2009/0251421 | A1 | 10/2009 | Bloebaum | |
| 2009/0280891 | A1* | 11/2009 | Filipour et al. | 463/22 |
| 2010/0141407 | A1 | 6/2010 | Heubel et al. | |
| 2010/0173691 | A1* | 7/2010 | Wolfe | 463/17 |
| 2011/0109571 | A1* | 5/2011 | He et al. | 345/173 |
| 2011/0264491 | A1* | 10/2011 | Birnbaum et al. | 705/14.4 |
| 2011/0267181 | A1 | 11/2011 | Kildal | |
| 2011/0291947 | A1* | 12/2011 | Pemberton-Pigott | 345/173 |
| 2011/0316798 | A1 | 12/2011 | Jackson et al. | |
| 2012/0038562 | A1* | 2/2012 | Holman et al. | 345/173 |
| 2012/0206390 | A1 | 8/2012 | Ueno et al. | |
| 2014/0049483 | A1* | 2/2014 | Kim | 345/173 |

FOREIGN PATENT DOCUMENTS

EP         2375310 A1    10/2011

* cited by examiner

*Primary Examiner* — Ricardo L Osorio
(74) *Attorney, Agent, or Firm* — Birch, Stewart, Kolasch & Birch, LLP (57) ABSTRACT

A display device and a method for controlling the same are disclosed. The method includes providing a first tactile feedback to a first area of a display unit, the first tactile feedback corresponding to texture information of the first area, detecting one or more touch inputs applied to the first area, accumulating attribute information of the touch inputs applied to the first area and storing the accumulated attribute information, updating the texture information of the first area according to the accumulated attribute information, and providing a second tactile feedback corresponding to the updated texture information of the first area.

18 Claims, 8 Drawing Sheets

DISPLAY DEVICE AND METHOD FOR CONTROLLING THE SAME

This application claims the benefit of Korean Patent Application No. 10-2012-0092338, filed on Aug. 23, 2012, which is hereby incorporated by reference as if fully set forth herein.

BACKGROUND OF THE INVENTION

1. Field of the Invention

The present invention relates to a display device, and more particularly, to a display device for changing the texture of a display area by accumulating attribute information of touch inputs and a method for controlling the same.

2. Discussion of the Related Art

Along with the growing use of display devices, methods for conveniently inputting user control commands have been developed. The technology of inputting user control commands has been developed from use of peripheral devices such as a keyboard, a mouse, etc. to touch input on a touch screen. A display device including a touch screen may detect a user's touch input and process the detected touch input as a control command. In addition, the display device may provide a tactile feedback to a user through the touch screen.

However, a conventional display device cannot display a changeable image adaptively according to a touch input. Rather, it just generates a predetermined tactile feedback according to a displayed image. Accordingly, there exists a need for a display device for generating a changeable image and tactile feedback that are changed according to a touch input or an ambient environment.

SUMMARY OF THE INVENTION

Accordingly, the present invention is directed to a display device and a method for controlling the same that substantially obviate one or more problems due to limitations and disadvantages of the related art.

An object of the present invention is to provide a display device and a method for controlling the same. Particularly, the display device needs to generate a tactile feedback corresponding to a displayed image, change the displayed image and the generated tactile feedback according to an external factor, and provide the changed image and tactile feedback.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a display device includes providing a first tactile feedback to a first area of a display unit, the first tactile feedback corresponding to texture information of the first area, detecting one or more touch inputs applied to the first area, accumulating attribute information of the touch inputs applied to the first area and storing the accumulated attribute information, updating the texture information of the first area according to the accumulated attribute information, and providing a second tactile feedback corresponding to the updated texture information of the first area.

In another aspect of the present invention, a display device includes a touch-sensitive display unit for detecting a touch input, a tactile feedback unit for providing a tactile feedback in response to the touch input, a storage unit for storing attribute information of the touch input, and a controller for controlling the units. The controller is configured to provide a first tactile feedback to a first area of the touch-sensitive display unit, the first tactile feedback corresponding to texture information of the first area, to detect a touch input applied to the first area, to accumulate attribute information of the touch input applied to the first area, to store the accumulated attribute information, to update the texture information of the first area according to the accumulated attribute information, and to provide a second tactile feedback corresponding to the updated texture information of the first area.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

The embodiments of the present invention will be described in detail with reference to the attached drawings and a description in the attached drawings, which should not be construed as limiting the present invention.

In addition, although the terms used in the present invention are selected from generally known and used terms, the terms may be changed according to the intention of an operator, customs, or the advent of new technology. Some of the terms mentioned in the description of the present invention have been selected by the applicant at his or her discretion, the detailed meanings of which are described in relevant parts of the description herein. Therefore, the present invention must be understood, not simply by the actual terms used but by the meanings of each term lying within.

The present invention is intended to accumulate and store attribute information of a user's touch inputs on a touch-sensitive display unit and change a tactile feedback according to the stored attribute information. The term used herein "touch input history" refers to stored accumulative attribute information of touch inputs and the term "changeable tactile feedback" refers to a tactile feedback that can change a texture based on the touch input history.

Figure 1:
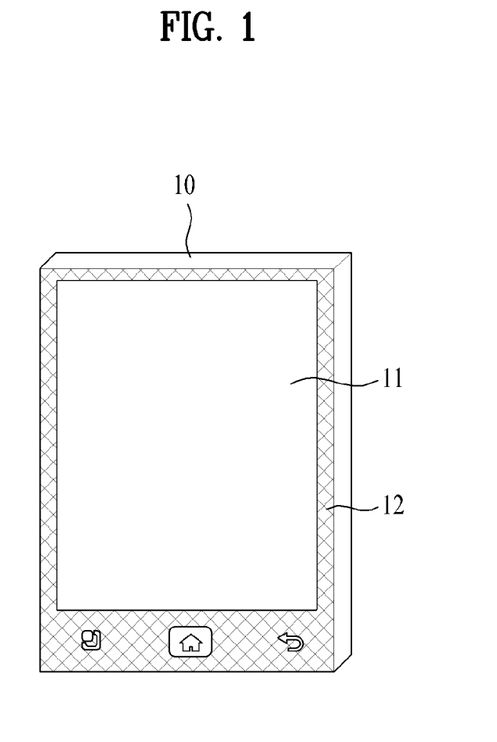
FIG. 1 illustrates a display device according to an embodiment of the present invention.

FIG. 1 illustrates a display device according to an embodiment of the present invention.

A display device 10 may include a display unit 11 and a case 12 near to the display unit 11 on its front part. A bezel may be additionally interposed between the display unit 11 and the case 12. A description of the case 12 herein is also applicable to the bezel. The display unit 11 may be formed of tempered glass, transparent plastic, or a flexible display material. The case 12 may be formed of plastic, carbon, ceramic, or metal. That is, the display device 10 may include the display unit 11 and the case 12 that are formed of different materials. The display device 10 may detect a user's input touch on the display unit 11. The user inputs an intended command by touching the display unit 11. When touching the display unit 11, the user may also touch the nearby case 12. Since the display unit 11 and the case are formed of different materials, the user may feel different textures at the boundary between the display unit 11 and the case 12 due to the different materials. It has been described above that the display unit 11 and the case 12 reside together in the front part. On the other hand, if only the display unit 11 exists in the front part, the user may experience different textures even when the display unit 11 and the case 12 disposed on a rear part or side part of the display device 10 are formed of different materials.

Figure 2:
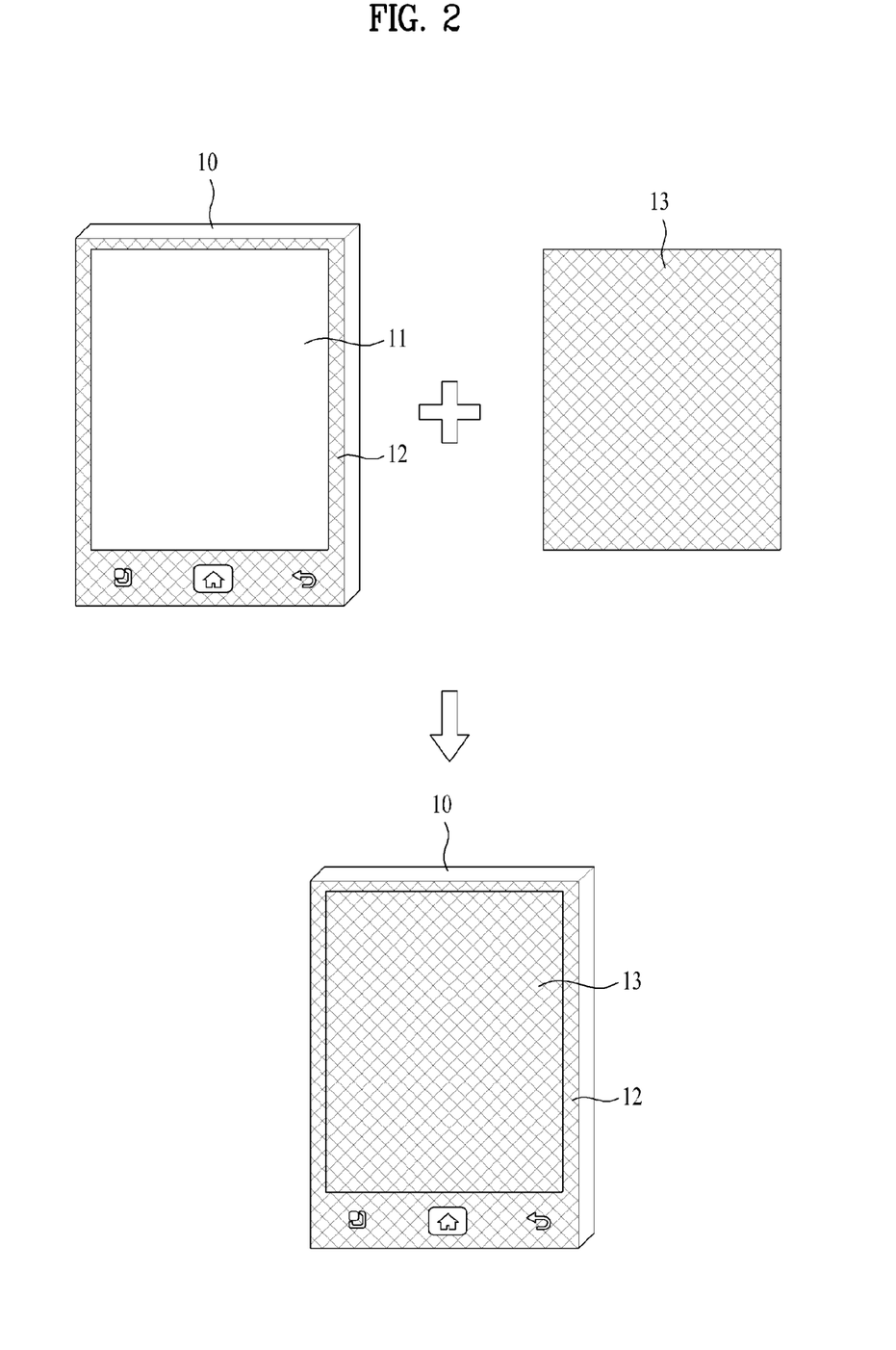
FIG. 2 illustrates a method for providing a tactile feedback in the display device according to an embodiment of the present invention.

FIG. 2 illustrates a method for providing a tactile feedback in the display device according to an embodiment of the present invention.

Referring to FIG. 2, the display device 10 may generate a tactile feedback 13 on the display unit 11 in order to mitigate different textures described with reference to FIG. 1 and provide a consistent texture. The tactile feedback 13 may be generated based on texture information of the case 12.

A display manufacturer may input the texture information of the case 12 to the display device 10. Or, the user may directly input the texture information of the case 12 to the display device 10 through a user interface of the display device 10 by comparing the texture of the case 12 with a texture provided by the tactile feedback 13. Or the display device 10 may utilize texture information obtained by capturing an image of the case 12. Specifically, the display device 10 may detect the texture of the case 12 from the captured image and set the detected texture as the texture information of the case 12.

The user may feel the texture of the case 12 on the display unit 11 through the tactile feedback 13 and may be tricked into feeling as if the display unit 11 and the case 12 were formed of the same material. In this manner, the display device 10 may relieve the difference between textures as described before with reference to FIG. 1 and provide a uniform texture. If the front part of the display device 10 includes only the display unit 11, the display device 10 may generate a tactile feedback on the display unit 11 in correspondence with the material of the display unit 11 and the material of the case 12 on the side part or the rear part of the display device 10.

Figure 3:
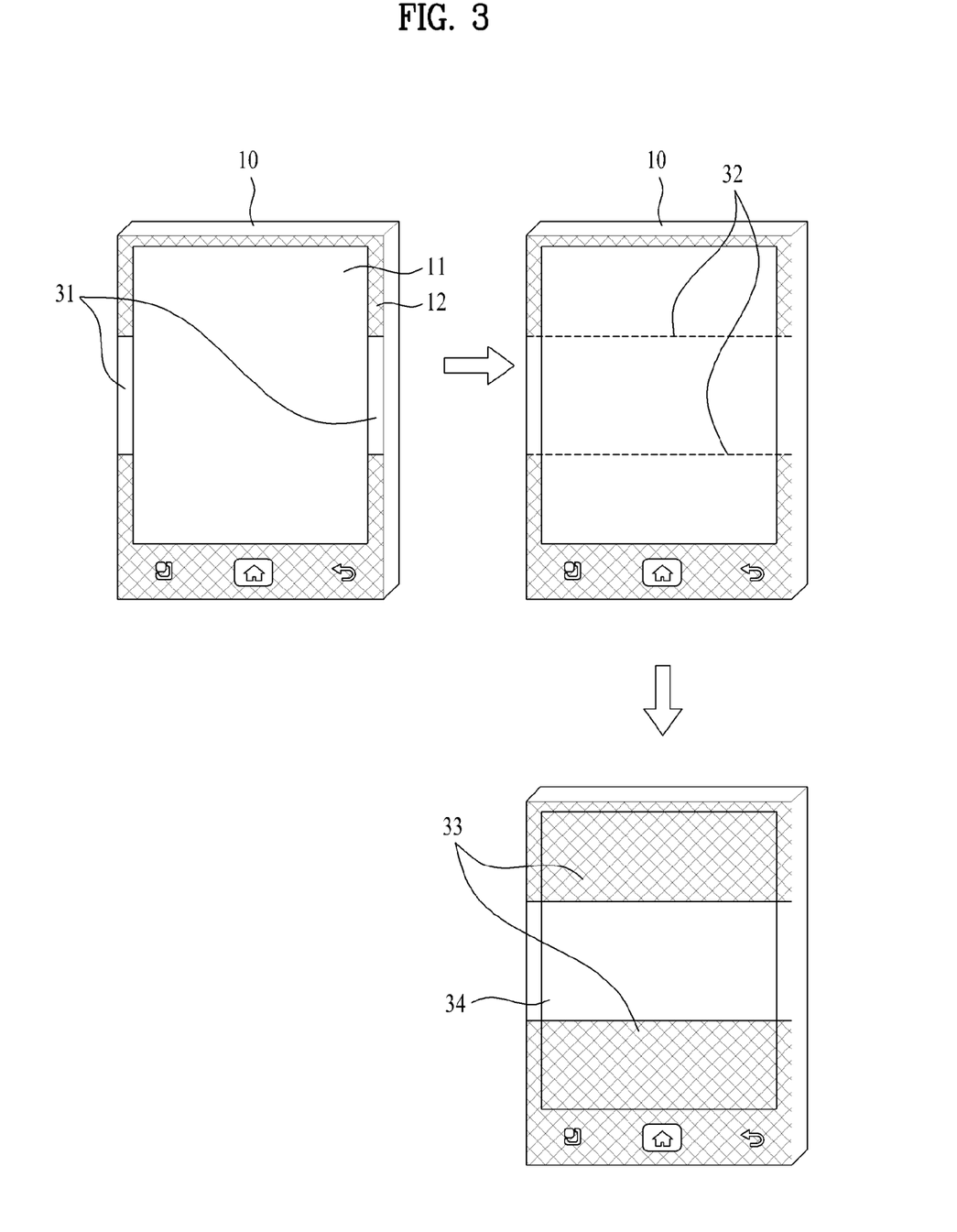
FIG. 3 illustrates a method for providing a tactile feedback in the display device according to another embodiment of the present invention.

FIG. 3 illustrates a method for providing a tactile feedback in the display device according to another embodiment of the present invention.

Referring to FIG. 3, the display device 10 may generate a tactile feedback corresponding to the texture of an accessory 31 attached to the whole or a part of the case 12. The accessory 31 may include a sticker that decorates the display device 10 or an additional case for protecting the display device 10 against a shock or scratch. Regarding an accessory attached to the full case 12, a consistent, uniform texture may be provided according to the method illustrated in FIG. 2. Now a description will be given of a method for providing a texture according to an accessory attached to a part of the case 12.

Lines 32 may be drawn from the accessory 31 attached to a part of the case 12. The display device 10 may define a plurality of areas on the display unit 11 using the lines 32 and may generate a tactile feedback in each area. The display device 10 may generate a tactile feedback in correspondence with the texture of the case 12 close to the display unit 11 or the texture of the attached accessory 31. In FIG. 3, upper and lower areas 33 of the display unit 11 are near to the case 12. Accordingly, the display device 10 may generate a tactile feedback corresponding to the texture of the case 12 in the upper and lower areas 33. Since a middle area 34 of the display unit 11 is near to the accessory 31, the display device 10 may generate a tactile feedback corresponding to the texture of the accessory 31 in the middle area 34. As a consequence, the user may receive tactile feedbacks corresponding to the textures of the case 12 and the accessory 31 and feel a consistent, uniform texture between the display unit 11 and the case 12 and between the display unit 11 and the accessory 31 in the respective areas.

Figure 4:
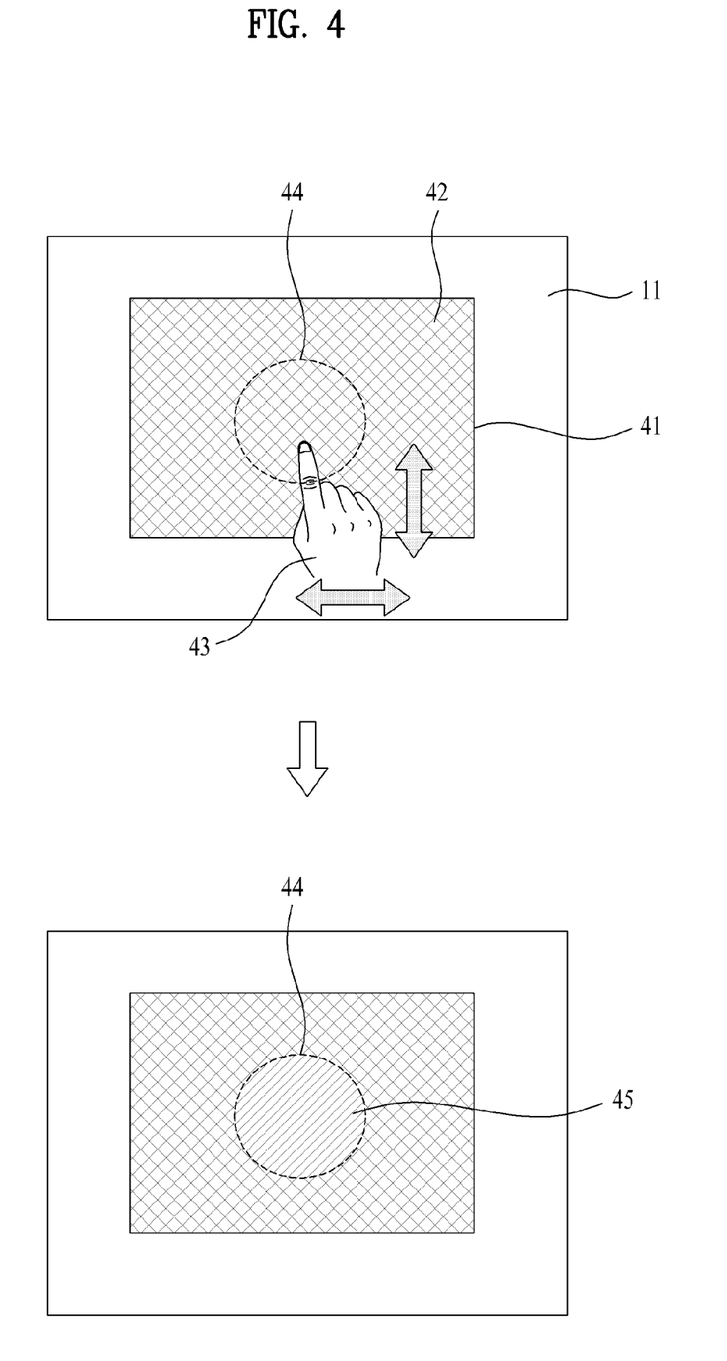
FIG. 4 illustrates a method for providing a changeable tactile feedback by accumulating attribute information of touch inputs according to an embodiment of the present invention.

FIG. 4 illustrates a method for providing a changeable tactile feedback by accumulating attribute information of touch inputs according to an embodiment of the present invention. The display device 10 may change at least one of a displayed image and a tactile feedback by reflecting a user's touch input. The display device 10 may detect attribute information of a user's touch inputs, accumulate the attribute information, and reflect the accumulated attribute information in the displayed image or tactile feedback.

The display device 10 may set texture information for each area of the display unit 11 and generate a tactile feedback in each area according to the texture information of the area. The texture information may include image information and tactile feedback information of the area. The image information may include information about an image displayed in the area. For example, the image information may specify the color, pattern, texture, and transparency of the displayed image. The tactile feedback information may include information about a tactile feedback generated in the area. The tactile feedback information may specify the texture and frictional force of the area.

Referring to the upper drawing of FIG. 4, the display unit 11 may display a first image and generate a first tactile feedback 42 in a first area 41 according to texture information set for the first area 41. When a user creates a touch input 43 in the first area 41, the display device 10 may detect the touch input 43, accumulate attribute information of the touch input 43, and store the accumulated attributed information as a touch input history. The attribute information of the touch input 43 may include information about at least one of the position, number of occurrences, and pressure of the touch input 43.

The display device 10 may update the texture information of each area using a stored touch input history. That is, the display device 10 may update image information and tactile feedback information of each area using a touch input history stored for the area. For example, the display device 10 may detect touch inputs in a second area 44 being a part of the first area 41. In FIG. 4, the second area 44 is marked by a circular broken line. The display device 10 may store attribute information of the touch inputs detected in the second area 44. In this case, the display device 10 may store information indicating that the positions of the touch inputs are the second area 44 and information about the number and pressures of the touch inputs. The display device 10 may store attribute information of touch inputs on the basis of coordinates of the display unit 11. In spite of one touch input, if the display device 10 detects one or more touch inputs at the same coordinates, the display device 10 may treat them as one or more touch inputs in storing information about them. This case may occur when the user touches the display unit 11 and then continues the touch up, down, left or right on the display unit 11.

The display device may update texture information of the second area 44 in correspondence with the stored attribute information of the touch inputs. For example, the display device 10 may update the texture information of the second area 44, taking into account how much the second area 44 has been worn by successive touch inputs. The display device 10 may calculate how much the second area 44 has been worn at a given position in proportion to the number and pressures of touch inputs created at the position.

The display device 10 may display a second image and a second tactile feedback 45 in the second area 44 based on the updated texture information. The display device 10 may display the second image representing the wear and tear result of the texture of the first image, caused by touch inputs. For example, if the first image has the texture of leather, the second image may have the texture of worn or faded leather. If the first image has the texture of fabric, the second image may have the texture of worn or frayed fabric.

The display device 10 may provide a softer texture than the texture provided by a first tactile feedback 42 by controlling a second tactile feedback 45. Thus, the display device 10 may indicate to the user that the second area 44 has been worn by touch inputs. In addition, the display device 10 may notify the user of frequent touch inputs in the second area 44 being a part of the first area 41. In this manner, the display device 10 may generate a touch input history for each area by storing attribute information of touch inputs applied to the area and may provide a changeable image and tactile feedback by reflecting the touch input history in texture information of the area.

Figure 5:
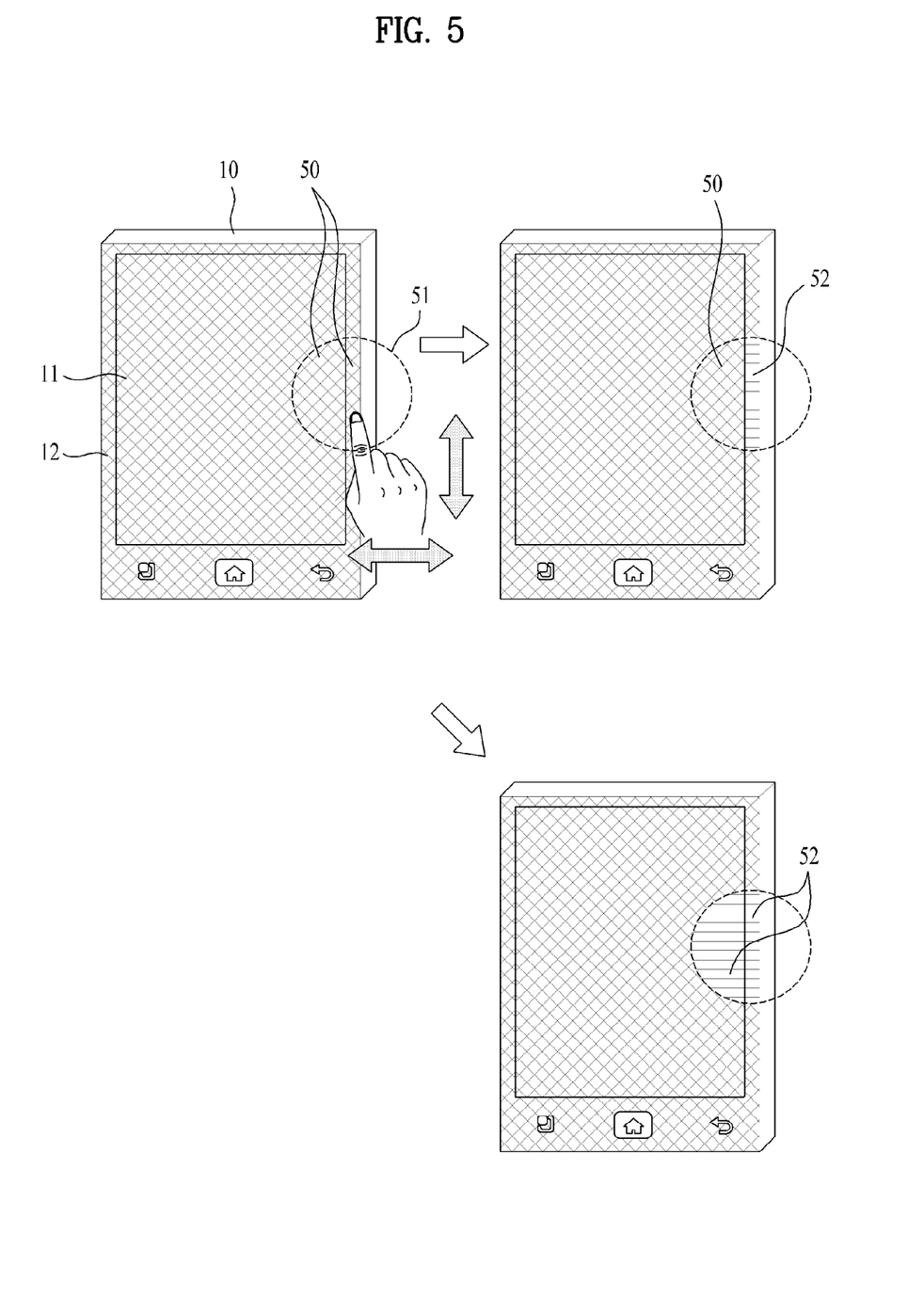
FIG. 5 illustrates a method for reflecting a change in the texture of a case in a changeable tactile feedback according to an embodiment of the present invention.

FIG. 5 illustrates a method for reflecting a change in the texture of a case in a changeable tactile feedback according to an embodiment of the present invention.

The case 12 of the display device 10 may be abraded physically in a specific area due to frequent user touches. This specific area is defined as a first area.

Meanwhile, since a tactile feedback provides a virtual texture in the display unit 10, the virtual texture is not worn physically. Therefore, the user may feel a difference between the texture of the worn case 12 of the display device 10 and the texture of the tactile feedback.

Referring to the left drawing of FIG. 5, the display device 10 may provide a first texture 50 identical to the texture of the case 12 by generating a tactile feedback on the display unit 11. The user may often touch a first area 51 of the display device 10. Virtual buttons or a scroll bar may be displayed in the first area 51. When the user creates a touch input in the first area 51, the user may touch the display unit 11 and the case 12 at the same time. This means that the first area 51 to which the touch input is applied may include a part of the case 12 and a part of the display unit 11.

The part of the case 12 included in the first area 51 may be physically worn due to frequent user touches. As illustrated in the right upper drawing of FIG. 5, the worn case 12 may provide a second texture 52 different from the first texture 50. In contrast, the tactile feedback of the part of the display unit 11 included in the first area 51 is not worn by touch inputs and thus maintains the first texture 50.

The display device 10 may provide a changeable image and tactile feedback in correspondence with the second texture of the physically worn case 12. For this purpose, the display device 10 may update texture information of the part of the display unit 11 included in the first area 51 to texture information of the second texture 52. The display device 10 may store accumulated attribute information of touch inputs and update texture information based on the accumulated attribute information. In updating the texture information, the display device 10 may store material information of the case 12 and calculate the degree of abrasion of the case 12 based on the stored material information. The material information of the case 12 may include information about the material type, wear resistance, and hardness degree of the case 12. The display device 10 may simulate the abrasion degree of the case 12 based on the material information of the case 12 and the accumulated attribute information of touch inputs and may update the texture information of the case 12 using the simulation result. The display device 10 may display an image having the second texture 52 and generate a tactile feedback having the second texture 52 on the part of the display unit 11 included in the first area 51.

Apart from the method for updating texture information by abrasion simulation, the display device 10 may allow a user to directly input texture information. The user may update the texture information of the part of the display unit 11 included in the first area 51 in correspondence with the texture of the part of the worn case 12 included in the first area 51. The display device 10 may display an image having the second texture 52 and generate a tactile feedback having the second texture 52 using the updated texture information. Or, the display device 10 may utilize texture information obtained by capturing an image of the worn case 12. The display device 10 may detect the texture of the case 12 in the captured image, set the detected texture as texture information of the case 12, and then display an image having the second texture 52 and generate a tactile feedback having the second texture 52 using the texture information.

As illustrated in the right lower drawing of FIG. 5, the display unit 10 may eventually display an image having the second texture 52 identical to the texture of the part of the case 12 included in the first area 51 and generate a tactile feedback having the second texture 52, thus providing the same texture as that of the case 12 to the user, regarding the part of the display unit 11 included in the first area 51.

Figure 6:
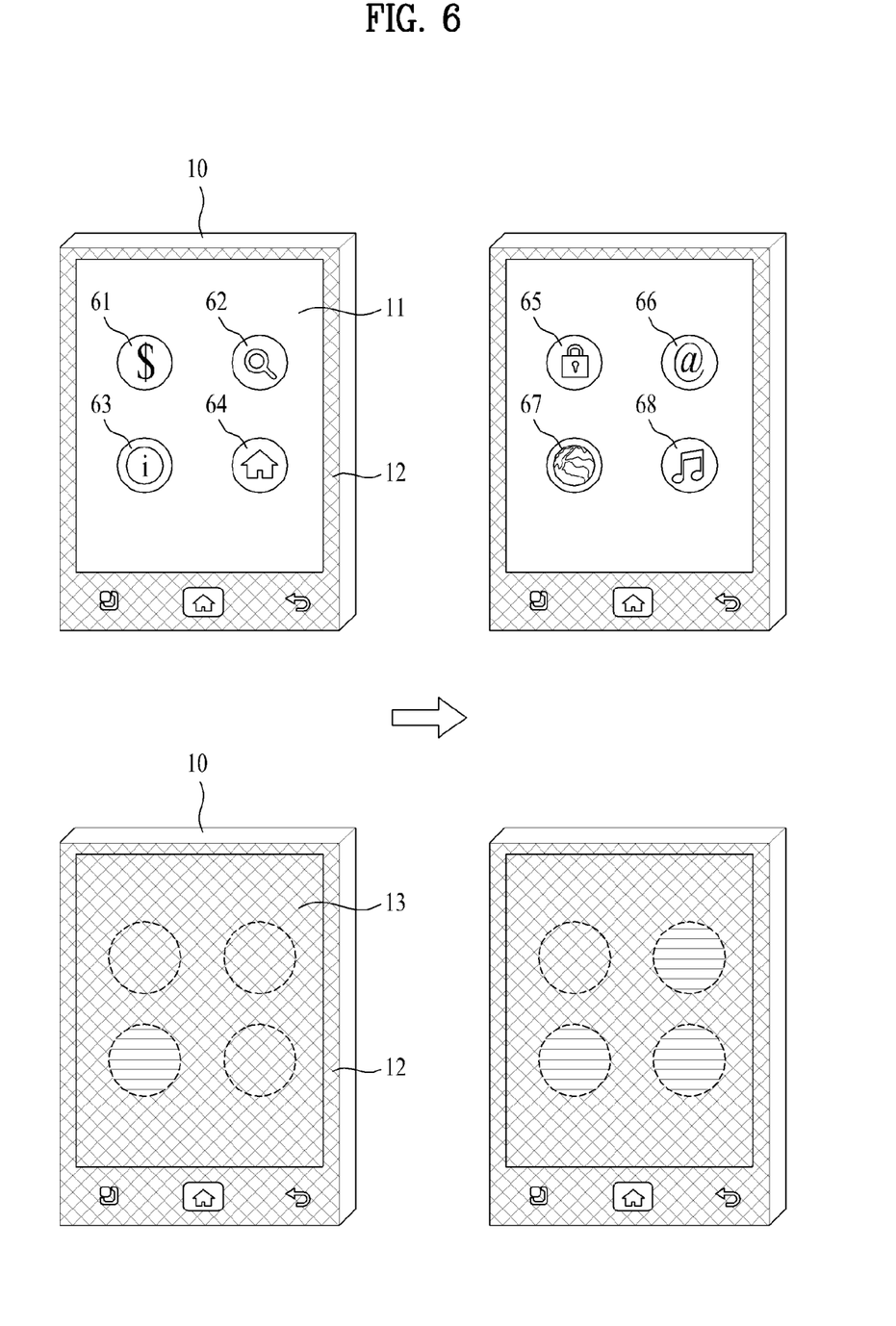
FIG. 6 illustrates a method for updating texture information for each displayed object according to an embodiment of the present invention.

FIG. 6 illustrates a method for updating texture information for each displayed object according to an embodiment of the present invention. As described before with reference to FIG. 5, the display device 10 may store a touch input history for an each area of the display unit 11, update texture information of the area using the stored touch input history, and thus provide a changeable tactile feedback in the area. On the other hand, the display device 10 may store a touch input history for each displayed object, update texture information of the object using the touch input history, and thus provide a changeable tactile feedback for the object. That is, the touch input history or the texture information may be coupled with the object. Objects are displayed in the display device 10 in the upper drawings of FIG. 6 and the display device 10 generates tactile feedbacks for objects in the lower drawings of FIG. 6.

The display device 10 may display objects on the display unit 11. The displayed objects may include an icon for executing an application or a background image. As illustrated in the left upper drawing of FIG. 6, the display device 10 may display objects for application operations on the display unit 11. The display device 10 may generate a touch input history for each object and update texture information of the object based on the touch input history.

As illustrated in the left lower drawing of FIG. 6, the display device 10 may provide different tactile feedbacks for different objects. For example, it may be assumed that first, second and fourth objects 61, 62 and 64 have the same texture information. Since the texture information includes tactile feedback information, the display device 10 may generate a first tactile feedback having the same texture as that of the case 12 in an area where the first, second and fourth objects 61, 62 and 64 are displayed. The display device 10 may also generate the first tactile feedback in a background image other than the areas of objects. On the other hand, a third object 63 may have different texture information from the first, second and fourth objects 61, 62 and 64. Therefore, the display device 10 may generate a second tactile feedback in the display area of the third object 64. Since texture information includes image information, the display device 10 may display the first, second, and fourth objects 61, 62 and 64 as having the same texture and may display the third object 63 as having a different texture from the first, second, and fourth objects 61, 62 and 64.

When the displayed objects 61 to 64 are switched to objects 65 to 68 illustrated in the right upper drawing of FIG. 6 in response to a user's touch input, tactile feedbacks may also be changed for the changed objects 65 to 68. The display device 10 may generate a tactile feedback according to texture information set for each displayed object. The display device may generate the first tactile feedback for the fifth object 65 and the second tactile feedback for the sixth, seventh, and eighth objects 66, 67 and 68.

As described above, the display device 10 may manage texture information for each displayed object and may apply a changeable image and tactile feedback for the object according to the texture information of the object. Accordingly, when a displayed object is changed, the display device 10 may generate a tactile feedback for the changed object according to texture information stored for the changed object.

If a plurality of objects are displayed overlapped, the display device 10 may update texture information of each of the objects in response to a touch input respectively. While the following description is given of a case where an object is overlapped with a background image, the same description is applicable to overlapped objects.

For instance, the first object 61 may be displayed over a background image as illustrated in the left upper drawing of FIG. 6. When the user touches the first object 61 10 times, the display device 10 may update texture information of the first object 61 by detecting the 10 touch inputs. In addition, for the background image underlying the first object 61, the display device 10 may update texture information of the background image according to the 10 touch inputs.

If the user touches the fifth object 65 20 times after the display unit 11 is changed as illustrated in the right upper drawing of FIG. 6, the display device 10 may detect 20 the touch inputs on the fifth object 65. The display device 10 updates the texture information of the fifth object 65 according to the 20 touch inputs. Regarding the background image underlying the fifth object 65, the image display device 10 may update texture information of the background image according to the 20 touch inputs. If the first object 61 and the fifth object 65 are located on the same position over the background image, the display device 10 may update the texture information according to a total of 30 touch inputs applied to the position over the background image. In other words, even though touch inputs are detected from different objects, if the objects are at the same position over the background image, the numbers of touch inputs applied to the objects may be summed and the texture information of the background image may be updated according to the sum.

As described above, the display device 10 may display a changeable image and provide a changeable tactile feedback in response to touch inputs by coupling an object with a touch input history or texture information. The object may be divided into a plurality of areas and a touch input history or texture information may be coupled with each area of the object. In addition, the display device 10 may accumulate attribute information of touch inputs independently for each area of the object, store the accumulated attributed information as a touch input history for the area, and thus update texture information of each area independently.

Figure 7:
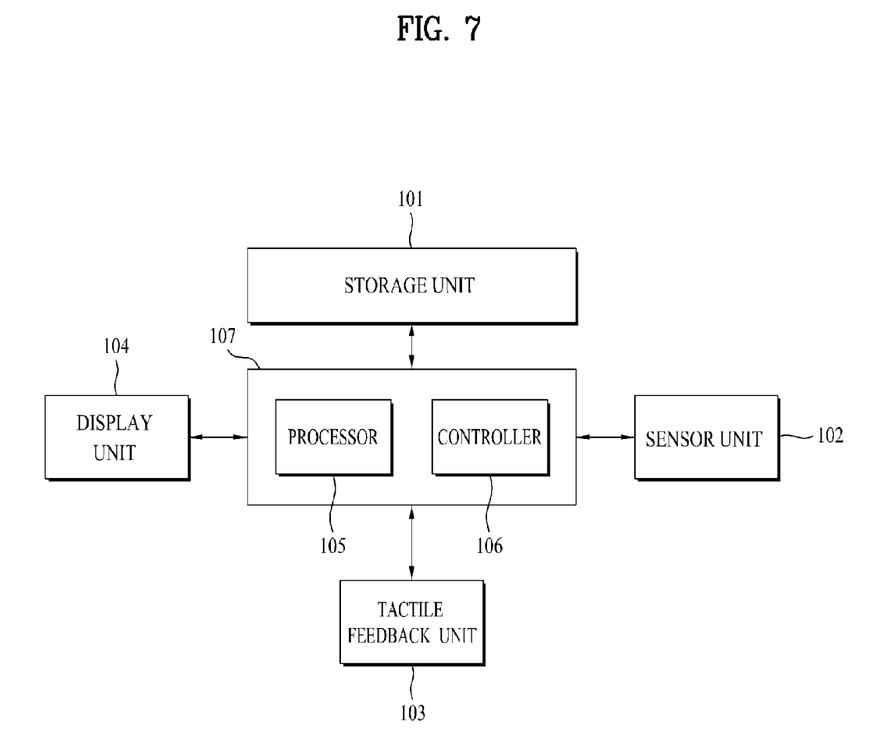
FIG. 7 is a block diagram of the display device according to an embodiment of the present invention.

FIG. 7 is a block diagram of the display device according to an embodiment of the present invention. Referring to FIG. 7, the display device may include a storage unit 101, a sensor unit 102, a tactile feedback unit 103, a display unit 104, a processor 105, and a controller 106.

The storage unit 101 may store various digital data including videos, audios, photos, applications, etc. The storage unit 101 includes various digital data storage spaces such as a flash memory, a Hard Disk Drive (HDD), a Solid State Drive (SDD), etc. The display device 10 according to the present invention may store touch input histories in the storage unit 101. The touch input histories may be stored for individual areas of the display unit 11 or for individual objects displayed on the display unit 11. The display device 10 may update texture information using a touch input history stored in the storage unit 101.

The sensor unit 102 may sense a user's touch input or ambient conditions perceived by the display device 10 using a plurality of sensors mounted to the display device 10 and may transmit the sensed information to the controller 106. The sensor unit 102 may include a plurality of sensors. In accordance with an embodiment of the present invention, the plurality of sensors may include a piezoelectric sensor, a gravity sensor, a motion sensor, a gyro sensor, an acceleration sensor, an audio sensor, a video sensor, a Global Positioning System (GPS) sensor, a touch sensor, etc. In the present invention, the touch sensor may detect a user's touch input. The display device 10 may analyze attribute information of the touch input detected by the sensor unit 102. The attribute information of the touch input may include information about the position, number of occurrences, and pressure of the touch input. The piezoelectric or pressure sensor may detect the pressure of a user's touch input. The display device 10 may generate a touch input history based on the attribute information of the sensed touch input and apply the touch input history to a tactile feedback.

The above-described sensors are collectively referred to as the sensor unit 102. The sensor unit 102 may detect touch inputs having various attributes and provide the sensed results so that the display device 10 may perform a corresponding operation. The afore-described sensors may be included as separate elements in the display device 10 or may be incorporated into at least one element in the display device 10.

The tactile feedback unit 103 may provide a tactile feedback to a user's finger or a stylus pen that touches the display unit 11, using a fine vibration actuator. The tactile feedback unit 103 may control a vibration frequency and a vibration magnitude and thus may control the frictional force between the user's finger and the display unit 11 based on the controlled vibration frequency and magnitude. In addition, the tactile feedback unit 103 may provide a tactile feedback to a user by generating micro current on the display unit 11. The tactile feedback unit 103 may control the intensity and generation interval of current, thereby making a user get different tactile feelings. The tactile feedback unit 103 may also provide a tactile feedback by ultrasonic resonance. The tactile feedback unit 103 may provide a tactile feedback to a user by generating a plurality of ultrasonic waves and resonating the ultrasonic waves. The tactile feedback unit 103 may provide different tactile feedbacks by controlling a resonant frequency and a resonant interval. The tactile feedback unit 103 may generate a changeable tactile feedback that is changed according to a touch input history and texture information stored in the storage unit 101. That is, the tactile feedback unit 103 may provide a variant tactile feedback so that the user can get use sensation on the display unit 11. In addition, the tactile feedback unit 103 may provide the user with a consistent, uniform texture between the display unit 11 and the case 12 by generating a tactile feedback on the display unit 11, which gives the same texture as that of the case 12.

The display unit 104 may output an image on a display screen. In case of a touch-sensitive display, the display unit 104 may be used as the afore-mentioned touch sensor. Thus, the display unit 104 may detect a touch input and notify the controller 106 of the attributes of the touch input. According to the present invention, the display unit 104 may display an object and detect a user's touch input. In addition, the display unit 104 may provide a tactile feedback to the user in conjunction with the tactile feedback unit 103. The display unit 104 may include a flexible display.

The processor 105 may execute various applications stored in the storage unit 101 and process internal data of the display device 10.

The controller 106 may control the units of the display device 10 and manage data transmission and reception between units.

The processor 105 and the controller 106 may be incorporated into a single chip and may perform the above-described operations in conjunction with each other. Therefore, the processor 105 and the controller 106 may be collectively referred to as the controller 106 hereinbelow. In the present invention, the controller 106 may generate a touch input history by accumulating attribute information of touch inputs. The controller 106 may also update texture information set for each area of the display unit 104 or each object displayed on the display unit 104 based on the generated touch input history. The controller 106 may generate a changeable tactile feedback corresponding to the updated texture information through the tactile feedback unit 103. Consequently, the user may receive a natural texture reflecting use sensation on the display unit 104.

Function blocks shown in FIG. 7 as separately configured are logically separate. Accordingly, the elements of the display device 10 may be implemented on one or more chips according to device design.

Figure 8:
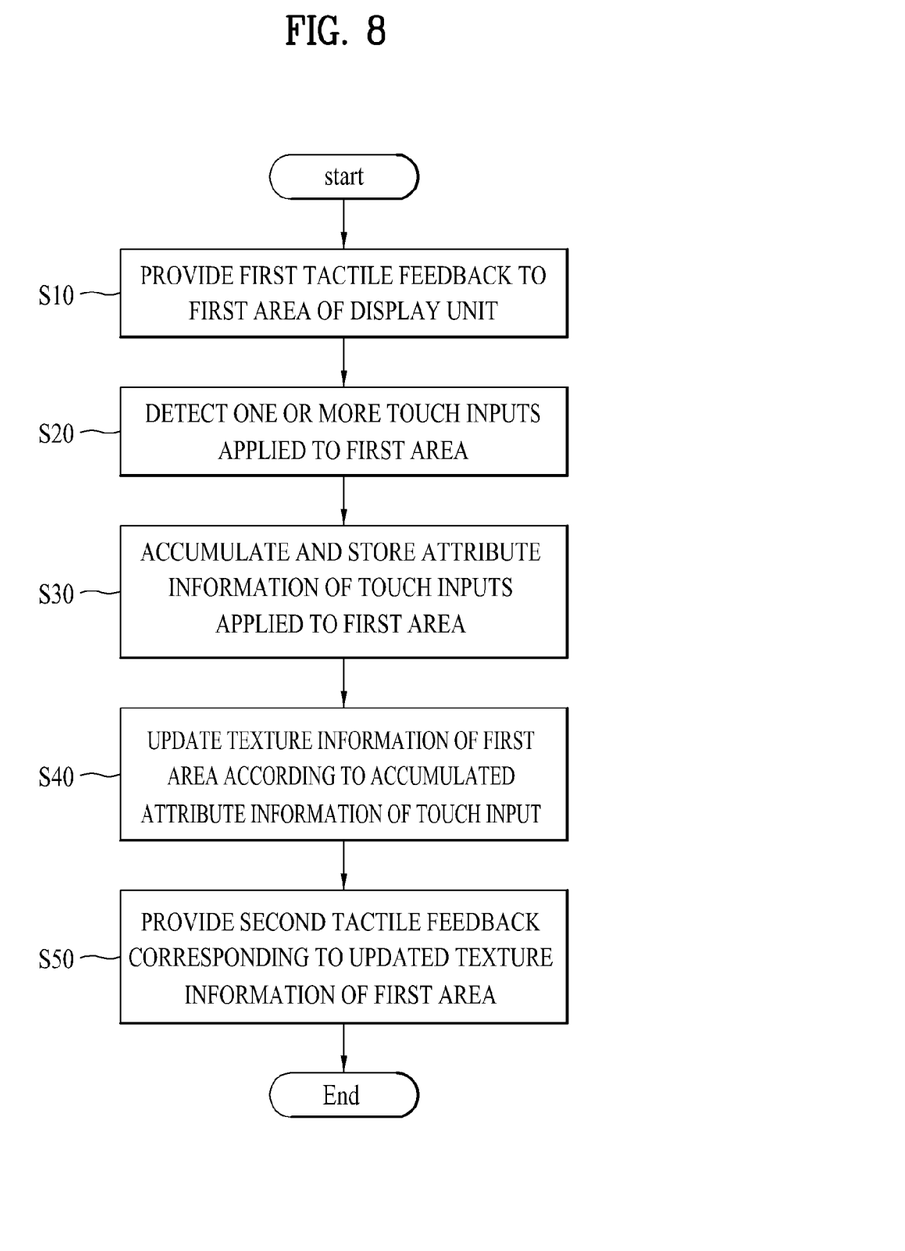
FIG. 8 is a flowchart illustrating a method for generating a changeable image and a changeable tactile feedback according to an embodiment of the present invention.

FIG. 8 is a flowchart illustrating a method for generating a changeable image and tactile feedback according to an embodiment of the present invention.

Referring to FIG. 8, the display device 10 may provide a first tactile feedback to a first area of the display unit 11 (S10). As described before with reference to FIG. 2, the display device 10 may generate the first tactile feedback in correspondence with texture information set for the first area. The display device may control the magnitude of frictional force provided by the first tactile feedback according to tactile feedback information included in the texture information of the first area.

The texture information may specify a texture intended with the first tactile feedback, durability of abrasion of the texture, and the hardness of the texture. Further, the display device 10 may display a first image according to image information included in the texture information of the first area.

The display device 10 may sense an ambient condition before generating the first tactile feedback and may generate the first tactile feedback according to the texture information of the first area and the sensed ambient condition. The ambient condition may include temperature, humidity, and air pressure conditions. In spite of the same texture information, the display device 10 may generate different tactile feedbacks according to the ambient condition. For example, when temperature or humidity increases, the display device 10 may generate a tactile feedback representing an increased frictional force.

As described before with reference to FIGS. 2 and 3, the texture information of the first area may be configured in correspondence with the texture of the case 12 close to the display unit 11 in an embodiment of the present invention. That is, before providing the tactile feedback, the display device 10 may receive texture information of the case 12 close to the display unit 11 and set the texture information of the first area based on the texture information of the case 12.

In accordance with an embodiment of the present invention, the texture information of the first area may be set as attribute information of an object displayed in the first area. The display device 10 may set the texture information of the first area in correspondence with the texture of the displayed object.

Subsequently, the display device may detect a touch input applied to the first area (S20). The display device may detect a touch input applied to the first area using the sensor unit or the touch-sensitive display unit. The touch input may be created by a touch tool such as a user's finger or a stylus pen.

The display device 10 may accumulate attribute information of touch inputs in the first area and store the accumulated attribute information (S30). The attribute information of the touch inputs may include information about the positions, number, and pressures of the touch inputs. The attribute information of individual touch inputs may be accumulated and then stored. The display device 10 may store a touch input history for each area of the display unit 11 in an embodiment of the present invention. In another embodiment of the present invention, the display device 10 may store a touch input history coupled with a displayed object or an area of the object.

The display device 10 may update the texture information of the first area according to the accumulated attribute information of the touch inputs (S40). As described before with reference to FIG. 4, the display device 10 may update the texture information of the first area to change the first tactile feedback in the first area of the display unit 11. The display device 10 may simulate the abrasion of the texture of the first area caused by the touch inputs, taking into account the texture of the first area, durability of abrasion, and hardness of the texture of the first area. That is, the display device 10 may calculate how much the texture of the first area has been changed based on the attributes of the touch inputs accumulated as the touch input history. In an embodiment of the present invention, the display device 10 may calculate how much the texture of the first area has been worn as texture information of the first area, in inverse proportion to the number of touch inputs. That is, as the number of touch inputs is increased, the roughness of the texture may be decreased.

The display device 10 may update the texture information of the first area using a simulation result. In an embodiment of the present invention, the display device 10 may simulate the abrasion of the case 12 in correspondence with the texture information of the case 12 and the attribute information of the touch inputs, as described before with reference to FIG. 5. In another embodiment of the present invention, the display device 10 may simulate the abrasion of the surface of an object displayed in the first area in correspondence with texture information of the object and the attribute information of touch inputs, as described before with reference to FIG. 6.

The display device 10 may provide a second tactile feedback corresponding to the updated texture information of the first area (850). The display device 10 may use tactile feedback information included in the texture information in order to provide a second tactile feedback. The second tactile feedback may provide the texture of a worn case or a worn object in an embodiment of the present invention. The display device 10 may control the magnitude of frictional force represented by the second tactile feedback in inverse proportion to the number of touch inputs. As the number of touch inputs is increased, the abrasion of the case 12 or the object increases, thereby softening the texture of the first area and decreasing the frictional force.

The display device 10 may provide a changeable tactile feedback to a user by changing the first tactile feedback to the second tactile feedback in the first area. As the user receives the changeable tactile feedback, the user may get knowledge of the position of a frequently touched part. The user may also feel a uniform texture by receiving the same texture as that of the worn case 12 from the display unit 11.

Furthermore, the display device 10 may display a second image corresponding to image information included in the updated texture information of the first area. Since the display device 10 changes the first image to the second image, it can visually provide the process of changing an image displayed in the first area.

As is apparent from the above description, a tactile feedback can be generated in correspondence with a displayed image.

A tactile feedback corresponding to the texture of a case near to a display unit can be generated on the display unit. Thus, a consistent texture can be provided.

In addition, an external factor can be sensed and stored as digital information.

An image and a tactile feedback can be changed according to an external factor.

A tactile feedback may be coupled with a displayed object.

The attribute information of touch inputs applied to overlapped displayed objects can be accumulated and reflected in the overlapped objects.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a display device, comprising:
   providing a first tactile feedback to a first point of a display unit corresponding to texture information of the first point, wherein the texture information of the first point corresponds to texture information of a case of the display device;
   detecting a number of touch inputs applied to the first point;
   accumulating attribute information of each touch input of the touch inputs applied to the first point and storing the accumulated attribute information;
   updating the texture information of the first point first according to the accumulated attribute information and the texture information of the case of the display device; and
   providing a second tactile feedback corresponding to the updated texture information of the first point,
   wherein the first tactile feedback is softened gradually to the second tactile feedback as the number of the touch inputs of which the attribute information is accumulated is increased.

2. The method according to claim 1, wherein the accumulated attribute information includes information specifying a number of the detected touch inputs.

3. The method according to claim 1, further comprising:
   displaying a first image corresponding to the texture information of the first point; and
   displaying a second image corresponding to the updated texture information of the first point.

4. The method according to claim 1, wherein the texture information of the first point includes image information and tactile feedback information of the first point.

5. The method according to claim 4, wherein the image information of the first point includes information about color, pattern, texture, and transparency of an image displayed in the first point.

6. The method according to claim 4, wherein the updating of the texture information of the first point comprises updating the image information and the tactile feedback information based on a degree of abrasion of a texture indicated by the texture information of the first point, caused by the touch inputs.

7. The method according to claim 1, wherein the texture information of the first point is set by:
   capturing the case of the display device;
   detecting a texture of the captured case of the display device; and
   setting the detected texture of the case of the display device as the texture information of the first point.

8. The method according to claim 1, further comprising displaying an object in the first point of the display unit, wherein the texture information of the first point is texture information of the object displayed in the first point and the attribute information of the touch inputs applied to the first point is accumulated in conjunction with the object.

9. The method according to claim 8, wherein the updating of the texture information of the first point comprises updating the texture information of the first point in correspondence with the texture information of the object displayed in the first point and the accumulated attribute information of the touch inputs.

10. The method according to claim 8, wherein the object includes a plurality of points and the first point is one of the plurality of points.

11. The method according to claim 10, wherein the attribute information of the touch inputs is accumulated and stored respectively for each of the plurality of points of the object.

12. The method according to claim 1, further comprising displaying a first object and a second object in the first point of the display unit, wherein the first and second objects are displayed at least in a partially overlapped manner, and the texture information of the first object and the second object are updated respectively.

13. The method according to claim 1, wherein the providing of the first tactile feedback comprises controlling the magnitude of frictional force provided by the first tactile feedback according to the texture information of the first point.

14. The method according to claim 1, wherein the providing of the second tactile feedback comprises controlling the magnitude of frictional force provided by the second tactile feedback in inverse proportion to a number of occurrences of the touch inputs.

15. The method according to claim 1, wherein the providing of the first tactile feedback comprises generating the first tactile feedback by an ultrasonic vibration and controlling the magnitude of frictional force provided by the first tactile feedback by changing a frequency and magnitude of the ultrasonic vibration.

16. The method according to claim 1, further comprising sensing an ambient condition of the display device,
wherein the first tactile feedback is provided in correspondence with the texture information of the first point and the sensed ambient condition.

17. The method according to claim 16, wherein the ambient condition includes temperature, humidity, and air pressure.

18. A display device comprising:
a touch-sensitive display unit configured to detect a touch input;
a tactile feedback unit configured to provide a tactile feedback in response to the touch input;
a storage unit configured to store attribute information of the touch input; and
a controller configured to:
provide a first tactile feedback to a first point of the touch-sensitive display unit corresponding to texture information of the first point stored in the storage unit, wherein the texture information of the first point corresponds to texture information of a case of the display device;
detect a number of touch inputs applied to the first point;
accumulate attribute information of each touch input of the touch inputs applied to the first point;
store the accumulated attribute information in the storage unit;
update the texture information of the first point according to the accumulated attribute information and the texture information of the case of the display device; and
provide a second tactile feedback corresponding to the updated texture information of the first point,
wherein the first tactile feedback is softened gradually to the second tactile feedback as the number of the touch inputs of which the attribute information is accumulated is increased.

* * * * *